(12) United States Patent
Smola et al.

(10) Patent No.: US 11,176,489 B1
(45) Date of Patent: Nov. 16, 2021

(54) OPTIMAL MESSAGE SCHEDULING FOR AGGREGATION

(71) Applicant: Amazon Technologies, Inc., Seattle, WA (US)

(72) Inventors: Alexander Johannes Smola, Sunnyvale, CA (US); Edo Liberty, New York, NY (US); Mu Li, Union City, CA (US); Leyuan Wang, Davis, CA (US)

(73) Assignee: Amazon Technologies, Inc., Seattle, WA (US)

( * ) Notice: Subject to any disclaimer, the term of this patent is extended or adjusted under 35 U.S.C. 154(b) by 868 days.

(21) Appl. No.: 15/954,913

(22) Filed: Apr. 17, 2018

(51) Int. Cl.
*G06N 20/00* (2019.01)
*G06F 9/54* (2006.01)
*G06K 9/62* (2006.01)
*G06N 3/04* (2006.01)
*G06N 3/02* (2006.01)

(52) U.S. Cl.
CPC ............ *G06N 20/00* (2019.01); *G06F 9/547* (2013.01); *G06N 3/04* (2013.01); *G06K 9/6256* (2013.01); *G06N 3/02* (2013.01)

(58) Field of Classification Search
None
See application file for complete search history.

(56) References Cited

PUBLICATIONS

Ahmed, Amr, et al. "Scalable inference in latent variable models." Proceedings of the fifth ACM international conference on Web search and data mining. 2012. (Year: 2012).*
He, Bingsheng, et al. "Efficient gather and scatter operations on graphics processors." Proceedings of the 2007 ACM/IEEE conference on Supercomputing. 2007. (Year: 2007).*
Chae, Youngsu, et al. "Exposing the network: support for topology-sensitive applications." 2000 IEEE Third Conference on Open Architectures and Network Programming. Proceedings (Cat. No. 00EX401). IEEE, 2000. (Year: 2000).*

* cited by examiner

*Primary Examiner* — Vincent Gonzales
(74) *Attorney, Agent, or Firm* — NDWE LLP

(57) ABSTRACT

Techniques for determining and utilizing optimal aggregation schedules are described are described. A deep machine learning model can be trained using multiple processing elements implemented in one or multiple computing devices and that are interconnected using one or multiple types of links. An optimal aggregation schedule for such arbitrary topologies can be determined automatically. The determination may include solving a linear program on the spanning tree polytope. The optimal aggregation schedule can be utilized by the multiple processing elements to train the deep machine learning model.

20 Claims, 16 Drawing Sheets

OPTIMAL MESSAGE SCHEDULING FOR AGGREGATION

BACKGROUND

The field of machine learning has become widely acknowledged as a likely significant driver of the future of technology. Organizations everywhere now seek to use machine learning techniques to address a wide variety of problems, such as optimizing aspects of their products, processes, customer experience, etc. While the high-level view of machine learning sounds simple—e.g., provide training data to a computer, to allow the computer to automatically learn from the training data to generate a model that can make predictions for other data—implementing machine learning techniques in practice can be tremendously difficult.

This difficulty is partially due to the underlying algorithmic and mathematical complexities of machine learning algorithms, which are typically developed by academic researchers or individuals at the forefront of the field. Additionally, it is also difficult to generate, update, and deploy useful models, which can be extremely time and resource consumptive and filled with complexities. Moreover, machine learning models tend to be extremely focused on particular use cases and operating environments, and thus any change to the underlying environment or use case may require a complete regeneration of a new model. Further, constructing and deploying machine learning technologies is quite different from traditional software engineering, and requires practices and architectures different from what traditional software engineering development teams are familiar with.

BRIEF DESCRIPTION OF DRAWINGS

Various embodiments in accordance with the present disclosure will be described with reference to the drawings, in which.

DETAILED DESCRIPTION

Figure 1:
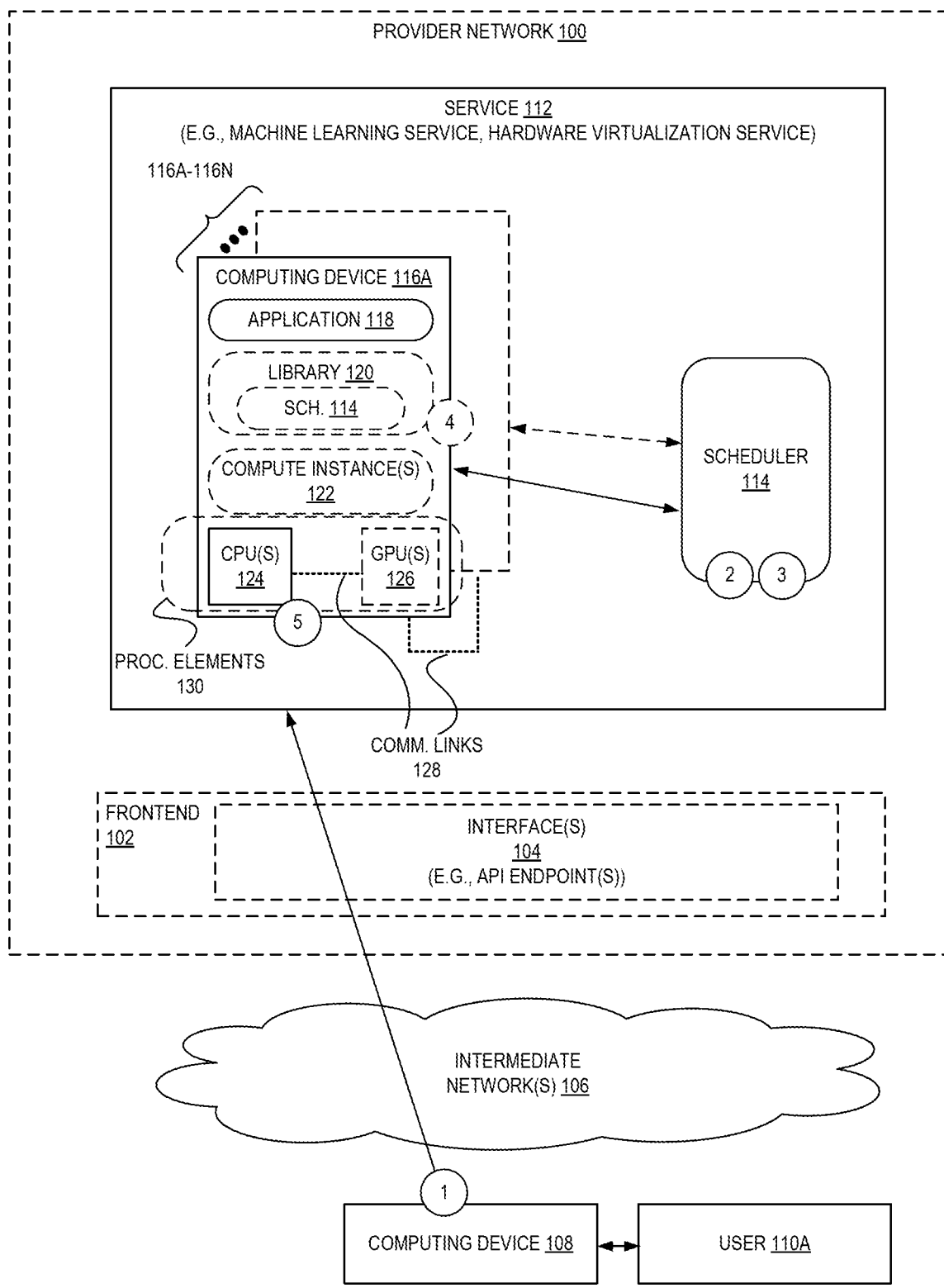
FIG. 1 is a diagram illustrating an environment for determining and utilizing optimal aggregation schedules according to some embodiments.

Various embodiments of methods, apparatus, systems, and non-transitory computer-readable storage media for determining and utilizing optimal aggregation schedules are described. According to some embodiments, an optimal or near-optimal communication schedule can be automatically determined for communications between distributed processing elements. The distributed processing elements can be configured to use the automatically determined schedule to communicate as efficiently as possible to improve the performance of a distributed application. For example, the distributed processing elements may jointly work on a common task—such as training a machine learning model or performing a high performance computing (HPC) workload—and use the automatically determined schedule to arrange inter-processing element communications (e.g., as part of gather-scatter operations common to many types of ML training algorithms) to increase the overall performance of the group of processing elements in performing the task. Thus, embodiments can automatically determine how to schedule gather-scatter algorithms efficiently across a network of compute elements and how to guarantee good convergence of these algorithms.

Machine learning (ML) algorithms, especially those considered to be "deep learning" algorithms, require large amounts of computation for the training of ML models. Deep learning is a type of machine learning that typically "trains" a computer to perform human-like tasks, such as recognizing human speech, identifying objects within images, understanding/generating human language, making predictions, etc. Deep learning algorithms may include, for example, neural networks such as Convolutional Neural Networks (CNNs), Recurrent Neural Networks (RNNs), fully-connected deep neural nets (DNNs), deep stacking networks (DSNs), etc.

A number of frameworks have been developed for parallel training of machine learning models. For example, frameworks such as TensorFlow™, the Microsoft™ Cognitive Toolkit (CNTK), and Apache™ MXNet™ have emerged to take advantage of multiple processing elements (e.g., graphical processing units (GPUs), accelerators, and/or central processing units (CPUs)) and/or entire clusters of computing devices. However, performing distributed training using such hardware is nontrivial as it utilizes large numbers of processing units connected in nontrivial and nonuniform manners.

Further, a key primitive in deep learning frameworks (and many other applications) is the gather-scatter operation. Given a set of parameters w, a set of updates $\delta_s$ often need to be aggregated from all servers $s \in S$, e.g., via $\delta = \oplus_s \delta_s$. These are then applied to $w \leftarrow f(w, \delta)$. Subsequently, the new value of w is broadcast to all servers s. Numerous variants of this protocol exist, e.g., with bounded delay and with asynchronous updates. For the purpose of this disclosure, the delay-less synchronous variant is predominantly focused upon for the sake of clarity; however, it is to be understood that embodiments can be applied in other configurations by those of skill in the art with the present disclosure.

In many cases, the delays involved of the transmission of the updates during gather-scatter operations make up a significant portion of the overall time needed during training. However, attempts to fine-tune the communications between processing elements to improve the distributed training performance would likely be limited to simply using closely-connected hardware, which isn't guaranteed or feasible (especially when deploying training tasks in a public cloud infrastructure), and moreover, may still be ineffective due to hardware constraints such as bus locations, available bandwidth, competition.

Figure 3:
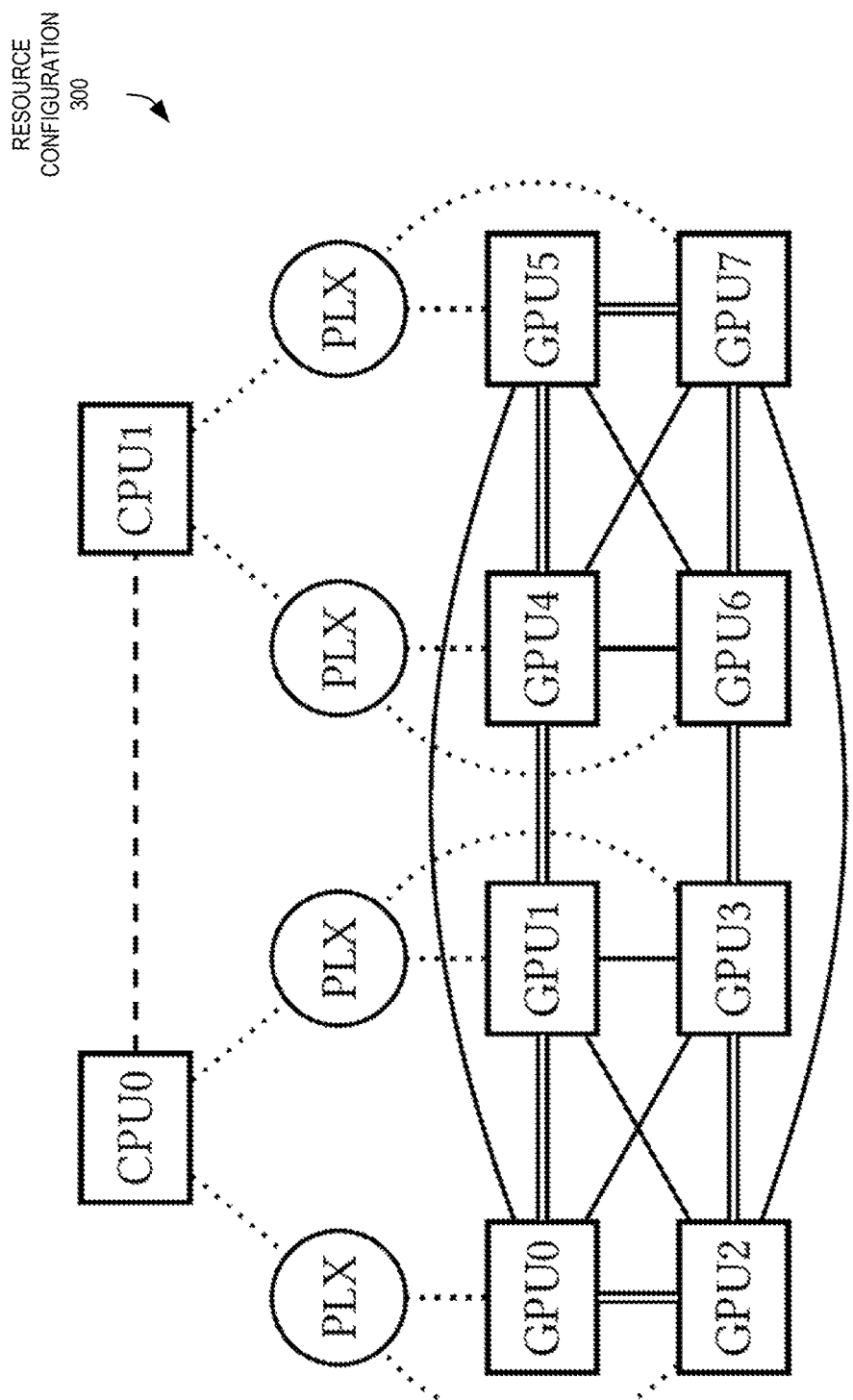
FIG. 3 is a diagram illustrating an exemplary topology indicative of a resource configuration of processing elements according to some embodiments.
Figure 8:
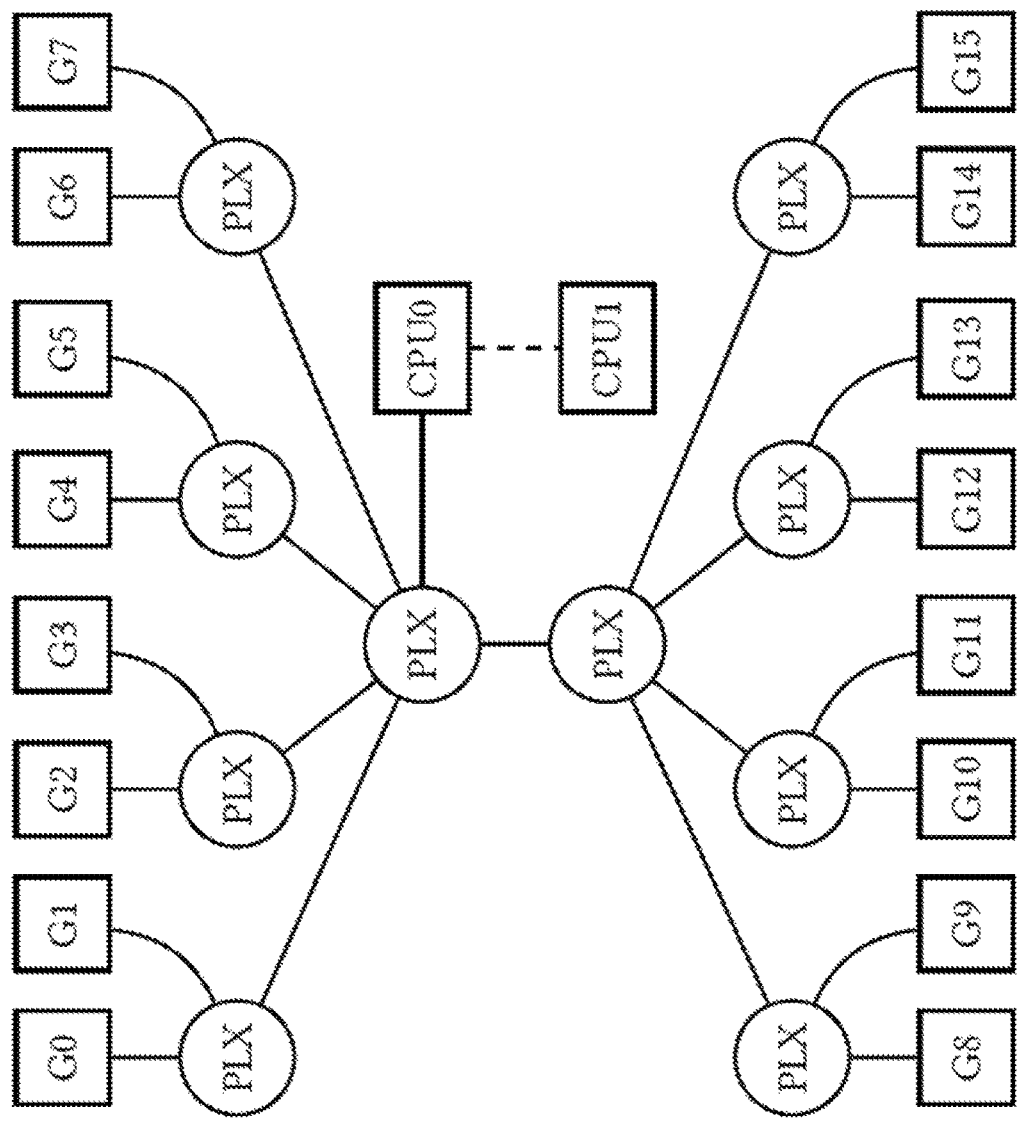
FIG. 8 is a diagram illustrating an exemplary resource configuration for a first exemplary instance type according to some embodiments.

To illustrate the connectivity issues in some detail, consider the architecture of two high-performance GPU-based servers shown in FIG. 3 and FIG. 8. For example, in FIG. 3, which roughly corresponds to the architecture of the DGX-1 (TM) from NVIDIA™ that is used in some provider networks, the communication design is shown with solid lines representing 300 GB NVLink interconnects between GPUs, dotted lines are PCI-Express bus lanes, and dashed lines correspond to Intel™ QuickPath Interconnect (QPI) interconnectors between CPUs. Note that the ring of GPUs has two NVLinks connections. Further, in FIG. 8, the solid lines are PCI-Express bus lanes between GPUs (shown as "G0-G15"), dotted lines correspond to Intel QPI interconnectors between CPUs (shown as "CPU0-CPU1"). All PLX™ PCI-Express switches (shown as "PLX") are 48 lanes wide, besides the two that are connected to CPU0 and CPU1 respectively, which are 96 lanes wide (the connection to CPU1 is used in some configurations, e.g., depending upon the type of compute instances that may execute using this hardware).

Accordingly, it is clear that a multitude of (different) processors, networking interconnectors, and bandwidths may exist on a single server device. This diversity increases considerably once the scope is changed beyond a single server device towards a network of server devices that may be assembled in an ad-hoc fashion via a cloud services provider.

For example, there is no guarantee that all server devices used for a task (e.g., deep network training) will share a same rack. After all, a user might request more computing capacity than fits into a rack or is currently available in any given rack in a provider network. Alternatively, the number of processing elements might be located within the same aisle of a server center, in different aisles, or even in different server centers or locations of the provider network. Thus, because users typically do not know the specific machine placement and network setup it is difficult to design an optimal algorithm at the network level.

At the same time, GPU memory size has outpaced the complexity of many ML models. For example, even the typically large embedding models can be compressed via Long short-term memory (LSTM) units and convolutions. Thus, data-parallel scaling of deep learning may be sufficient for most practical applications without the need for model striping. As a result, a main challenge is to determine how to schedule gather-scatter algorithms efficiently across a network of compute units and how to guarantee good convergence of the algorithm. Embodiments disclosed herein provide solutions to this challenge.

In considering the problem, both communication speed and convergence speed are relevant. After all, there is no benefit in designing algorithms that are fast yet inefficient in terms of machine learning, or conversely, algorithms that are statistically very attractive, yet with poor scaling. Fortunately, it is possible to adjust learning rates and updates in such a manner as to ensure fast convergence, provided that the bandwidth of communication is sufficiently high. Accordingly, embodiments focus on the former rather than the latter.

The diversity in architectures that may be utilized for distributed tasks, such as the architectures described in FIG. 3 or FIG. 8, illustrates a need to determine communications schedules automatically. It is unrealistic to expect users of deep learning frameworks to be experts in message scheduling, and similarly unrealistic to expect users to have sophisticated knowledge of underlying system architectures is also unreasonable, especially when deep learning is being performed in a service provider's network.

Notably, the involved systems have two key communication patterns. First, processing elements may be able to aggregate incoming messages and generate a (compressed/consolidated) outgoing message from that. For instance, a processing element might take two vectors as input and emit the sum of the two vectors. Such aggregation leads to a significant data reduction, such that the overall communications cost is given by the spanning tree connecting the nodes, as all but one of the nodes are incoming, while one is outgoing.

A second scenario arises when we have switches connecting nodes, such as a PLX for PCI Express bus lanes or a network switch between the processing elements that are unable to aggregate traffic. Accordingly, embodiments are cognizant of the aggregate traffic induced by processing nodes.

Thus, embodiments disclosed herein can be used to accelerate deep learning algorithms by determining and implementing optimal (or sufficiently optimal) communication scheduling between processing elements. However, embodiments can also be used with a much larger range of applications involving distributed processing and a substantial amount of communication, such as Bayesian nonparametrics, general convex optimization, etc. However, this disclosure will primarily focus upon distributed models with the unit of computation being replaced by a group of processing elements (e.g., GPUs, accelerators, CPUs, cores, ASICs, etc.) implementing the entire model rather than a single processing element.

FIG. 1 is a diagram illustrating an environment for determining and utilizing optimal aggregation schedules according to some embodiments. FIG. 1 includes a scheduler 114 and one or more computing devices 116A-116N, each having one or more processing elements—e.g., one or more CPUs 124, one or more GPUs 126, etc. The processing elements and/or computing devices 116 are coupled via one or more communication links, including but not limited to network links (e.g., fiberoptic, coaxial, twisted pair (e.g., Ethernet)), buses or interconnects (e.g., NVLinks, QPIs, Intel UltraPath Interconnect (UPI), etc. The scheduler 114 may be implemented as software, hardware, or a combination of both.

The one or more computing devices 116A-116N may provide compute instances 122 such as virtual machines or containers that can execute applications 118. In some embodiments, compute instances 122 are provided directly or indirectly to users 110 of a provider network 100 as part of a service 112. The service 112 may be, for example, a hardware virtualization service that provides users with compute instance related services, a machine learning service that provides users with machine learning related services (e.g., training and/or utilizing a machine learning model), etc.

Generally, a provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service that can execute compute instances, a storage virtualization service that can store data objects, etc. The users (or "customers") of provider networks 100 may utilize one or more user accounts that are associated with a customer account, though these terms may be used somewhat interchangeably depend ending upon the context of use. Users may interact with a provider network 100 across one or more intermediate networks 106 (e.g., the internal via one or more interface(s) 104, such as through use of application programming interface (API) calls, via a console implemented as a website or application, etc. The interface(s) 104 may be part of, or serve as a front-end to, a control plane 102 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

Thus, for example, a user 110A may utilize a computing device 108 (e.g., a personal computer (PC), mobile device such as a tablet or smart phone, server device, etc.) to send a request message at (1) to a service 112 (or provider network 100) indicating a request to implement or execute a distributed application 118. For example, the service 112 may be a ML service and the request may instruct the ML service to perform training of a ML model using a group of compute instances 122/computing devices 116. As another example, the service 112 may be a hardware virtualization service and the request may comprise one or more commands to cause the application 118 to be executed in a distributed manner (e.g., using GPUs 126 of one or more machines).

In some embodiments, the scheduler 114 at (2) identifies the topology of the deployed (or, to-be-deployed) group of processing elements used (or to be used) for implementing/executing the distributed application 118. In some embodiments, another component of the service 112 (with or without user input) may select particular computing devices 116/computing instances 122 to be used for the distributed application 118, and the scheduler 114 can obtain identifiers of these particular computing devices 116/computing instances 122 and determine the topology therefrom (e.g., by one or more of consulting a library of defined topology information for such devices, querying the devices to identify device characteristics, etc.).

At (3), the scheduler 114 can utilize techniques described herein to determine, based on the topology information, a communication schedule to be used by the involved processing elements 130 during execution of the application. For example, the communication schedule may be used for gather-scatter type operations involved in distributed training of ML models. In some embodiments, as shown by optional (4), a library 120 (e.g., a software library, such as a machine learning framework) may be provided and used (e.g., by the processing elements 130/compute instances 122/application 118) to adhere to, and thus implement, the defined communication schedule. For example, the scheduler 114 may provide the communication schedule to the one or more libraries 120 (e.g., a framework such as a ML framework) associated with the utilized processing elements 130 or to the application itself, and the one or more communications libraries 120 (or applications) can cause the transmission/reception of data at particular times indicated by the schedule at (5). In some embodiments, the scheduler 114 is separate from the library 120, though in other embodiments the scheduler 114 is part of the library 120.

Figure 2:
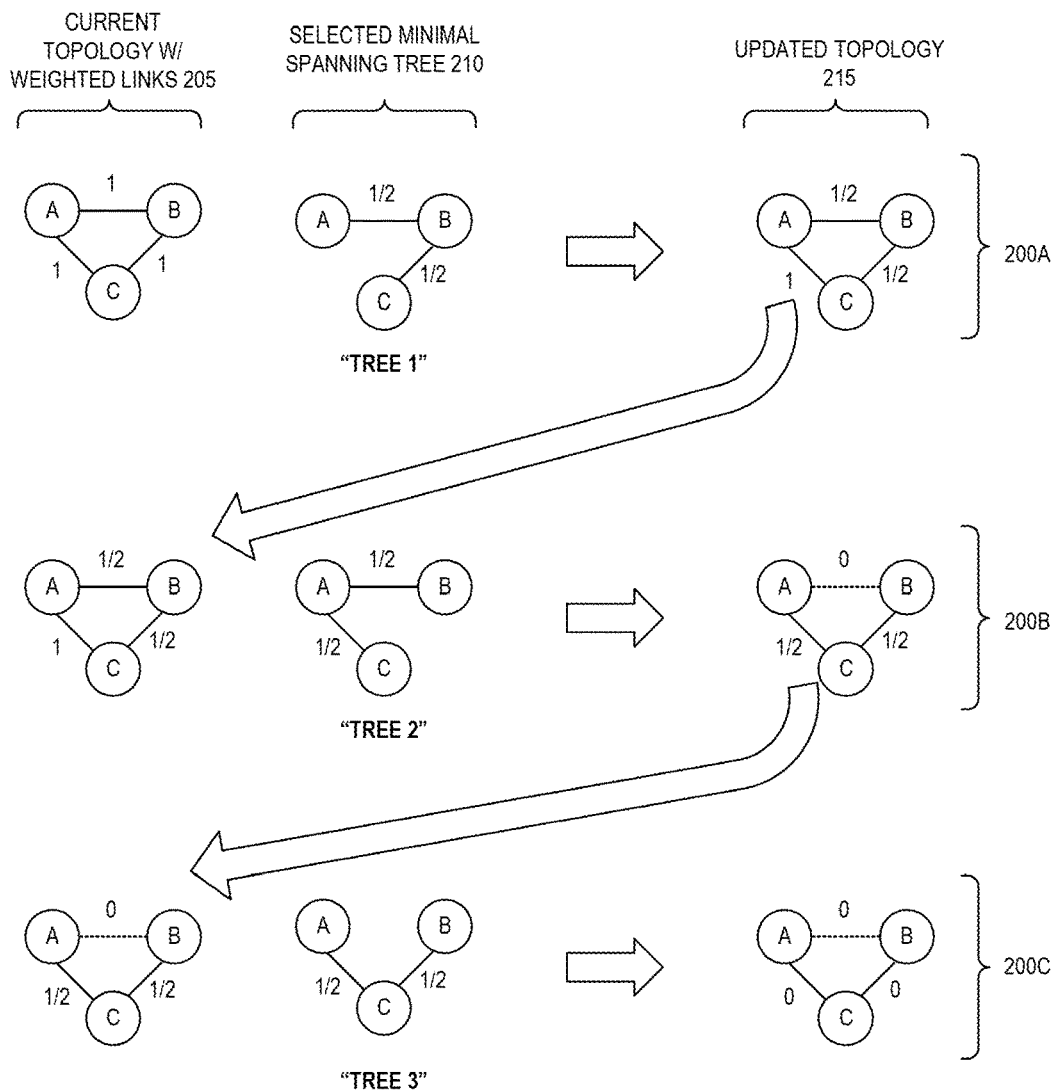
FIG. 2 is a diagram illustrating an exemplary greedy algorithm for determining an aggregation schedule according to some embodiments.
Figure 2:
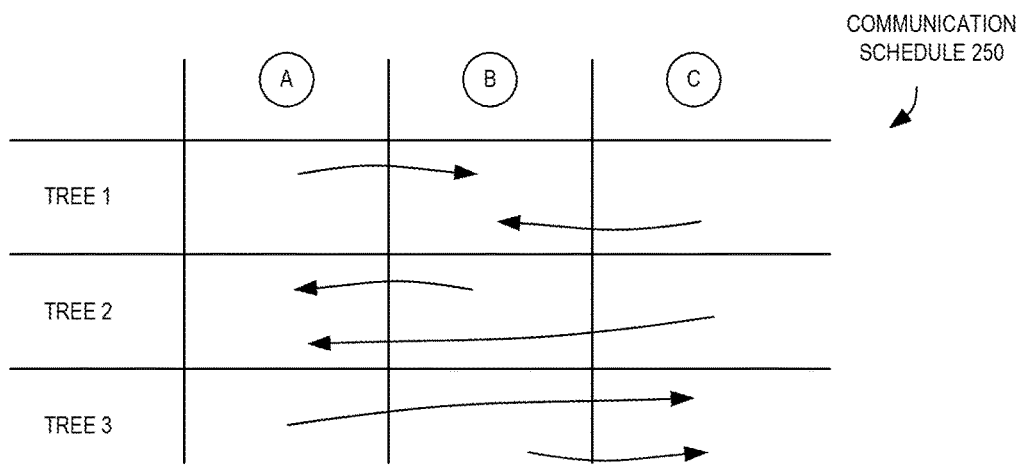

As simple example for determining an aggregation schedule using a greedy technique is first shown in FIG. 2 for the sake of understanding. However, additional complexities, details, and techniques for determining optimal communications schedules will be presented herein with regard to the other figures.

In FIG. 2, a current topology 205 with three nodes—e.g., three GPUs—and edges representing links between ones of the nodes (representing links between the GPUs) is shown as a ring. Each edge has a weight indicating a proportion of bandwidth available on the link—here, each weight is one (1), indicating that the link at this stage of analysis has not yet been used. In a first iteration 200A, a minimal spanning tree can then be selected, using the current topology 205. For example, a minimal spanning tree having a maximal total weight of edges can be selected as "TREE 1"—here, all possible spanning trees would have the same total weight, so one is selected. Each weight of each selected edge will be half consumed by data for this tree, so each link has a weight of ½. As a result, these weights are removed from the original topology 205 into the updated topology 215, where the edges A-B and B-C are now valued at ½.

In a second iteration 200B, a next minimal spanning tree can then be selected, using the "current" topology (here, the updated topology 215 from iteration 200A having edge weights of ½, ½, and 1). For example, a minimal spanning tree having a maximal total weight of edges can be selected as "TREE 2"—here, a tree B-A-C is selected at 210. Each selected link will have its weight/bandwidth reduced by ½, resulting in the updated topology 215 with weights (0, ½, and ½).

As another spanning tree can be selected, another third iteration 200C is performed to select the tree using the "current" topology (here, the updated topology 215 from second iteration 200B having edge weights of 0, ½, and ½). Thus, a minimal spanning tree having a maximal total weight of edges can be selected as "TREE 3"—here, a tree A-C-D is selected at 210. Each selected link will have its weight/bandwidth reduced by ½, resulting in the updated topology 215 with weights (0, 0, and 0). As no more spanning trees can be selected, the iterations can complete.

Thus, the communications "schedule" 250 can be identified in which nodes A and C send half of their data to node B, nodes B and C send half of their data to node A, and nodes A and B send half of their data to node C. Notably, this schedule can be determined to be an "optimal" schedule as detailed below. Accordingly, some embodiments may simply identify a single set of spanning trees (e.g., using a greedy algorithm described above), which will result in a very performant (and possibly optimal) schedule. However, some embodiments may determine (using techniques disclosed below) a value indicating what an optimal schedule would look like, and search one or multiple times until an optimal schedule is found.

As described herein, embodiments can be utilized for implementing distributed deep ML model training operations. Many distributed deep learning algorithms generally work as follows:

Partition the data X into (approximately) equal sets $X_s$ that are spread across the servers $s \in S$.

Initialize the parameters w to some reasonable value (e.g., marginal polytope, zero, etc.).

Iterate over data repeatedly, taking in minibatches $X_{st} \in Xs$ one at a time For each server s, compute an update message $\delta_{st}$, e.g. given by the gradient of the loss with regard to the parameters w on a minibatch $X_{st}$. That is:

$$\delta_s = \delta_W \Sigma_{x \in X_{st}} l^1(x, w)$$

Other variants involve sampling.

Send the updates $\delta_{st}$ to some central repository, e.g., a node acting as a parameter server, often asynchronously while computation continues.

Aggregate the updates $\delta_t = \oplus_s \delta_{st}$. They are typically elements of a semi-ring, satisfying the associative law for aggregation (a⊕b) ⊕c=a ⊕(b ⊕c).

Perform an update w←f (w, $\delta_t$).

Broadcast the new value of w back to all servers s.

Depending on the choice of inference algorithm the order and schedule for the updates may matter. Many efficient delay-tolerant update variants exist for many major statistical models. Furthermore, in many cases, parameters can be partitioned into a sufficiently large number of parameter groups (e.g., many advanced networks, such as ResNet, can have over two hundred layers, topic models over one million tokens), such that it is possible to partition w into subsets that a reasonably large number of groups, should we decide to update them independently, e.g., on different aggregation nodes. Thus, a main concern is with regard to the raw throughput.

While server centers have grown significantly, the number of ports in individual switches has not kept pace with this growth. This is ultimately due to physics, since O(n) ports can require up to $O(n^2)$ resources for full cross-sectional bandwidth. When coupled with the quest for ever-faster switches, building very large and fast switches is extremely cost prohibitive.

This restriction poses a number of challenges in the server center. While it is possible to connect some number (e.g., 48) of machines with full cross-sectional bandwidth on a single switch, this goal is rather elusive for larger groups. One option is to interconnect Top of the Rack (TOR) switches using expensive high-performance networking. But even this leads to eventual oversubscription, whenever many servers want to communicate between racks, since a single high-bandwidth link can carry only so much information.

Clos solved this problem in an ingenious manner when dealing with oversubscription in phone exchanges by proposing the eponymous Clos Networks. These ideas have been incorporated into server centers. While many variants exist, they all share one central idea: use multiple intermediate switches to connect the lower-level aggregation (or TOR) switches. The result is that bandwidth can grow, as long as one is willing to tolerate a very small increase in latency due to traffic traversing multiple switches. Note that this does not remove the problem of oversubscription, but it alleviates the problem to a reasonable extent.

When a user requests compute capacity in a provider network, the cloud provider system may attempt to co-locate all requested machines within a same rack, or least within a number of racks within a same aisle, for improved performance. Nonetheless, this may not always be the case, e.g., when the number of machines exceeds the amount of available resources within an aisle. Thus, the processing elements may be in a same computing device or in multiple computing devices, which may be in a same or different rack, same or different aisle, same or different data center, same or different building, same or different geographical area, etc. Additionally, in some cases an application may execute in a variety of locations using a variety of types of processing elements. For example, part of a ML model could be trained using some customer equipment (e.g., a PC, mobile device such as a smart phone) and some of the ML model could be trained using server hardware (e.g., in a cloud provider network)—this configuration can ensure that certain confidential/personal data may stay under the control of the customer and not be provided to the cloud network, for example. Furthermore, other traffic in the provider network 100 or other networks—e.g., other tenants, systems, maintenance operations, etc.—can also impact the performance of the algorithms Nonetheless, embodiments generate communications/synchronization schedules that are near-optimal even in any of these types of environments.

For the sake of simplicity, assume for now that the computer network includes only nodes that are able to perform aggregation, e.g., a network of CPUs or of GPUs only. Embodiments involving network switches will be addressed later herein. To aggregate $\delta = \oplus_s \delta_s$ between servers, all changes ultimately need to reach one final server, s*. Moreover, by construction, the aggregation may need to incorporate all servers s. This is only possible if there is a spanning tree T connecting s* to all other nodes. Likewise, broadcasting the updated parameter w back to all servers requires a spanning tree. Without loss of generality, for the sake of discussion assume that the size of δ and of w is equal and that the tree T can be used for both purposes, as the connectivity is typically full duplex. As each node can compute, it strictly reduces network traffic if incoming messages are aggregated before transmitting the data onward to the next destination (of course, for broadcasting no such operation needs to take place).

Naively, communication on the tree T occurs by sending packets from one node to another. As a result, the time to synchronize would be determined by the edge capacity and the depth of the tree relative to its root. This is quite inefficient. Most edges in the tree will be idle at any given time. Instead, by streaming data across the edges simultaneously (as done in some embodiments), the overhead due to tree depth can be reduced to a negligible amount. Thus, each node can simply start streaming data, aggregate it on the fly, and transfer it to the next destination. Hence the total time for synchronization is determined by the slowest link.

By implementing streaming, a "best" such tree can be determined.

Formally, denote by G(V, E) an undirected graph with vertices V corresponding to compute units and edges E corresponding to communication links. Let T be the set of spanning trees on G. Let $c_e \geq 0$ denote the congestion coefficient for edge e. It is defined by $c_e = 1/b_e$ where $b_e$ is the bandwidth of the link corresponding to edge e. For the sake of simplicity, it is convenient and harmless to assume we need to synchronize exactly one unit of data. As a result, $c_e$ is equal to the total time to transmit all gradients through edge e. The time to synchronize all gradients along a single spanning T tree, thus, is dominated by the link with the lowest bandwidth used by the tree.

$$C(T) = \max_e c_e T_e \qquad (1)$$

Here, $T_e = 1$ if e∈T and zero else. The best such tree is trivially found by Boruvka's algorithm, one of the oldest algorithms in computer science. The algorithm proceeds by adding to T edges from the graph that have the smallest congestion cost $c_e$ and reduce the number of disconnected components. The algorithm terminates when no such edges remain.

Accordingly, use of Boruvka's minimum weight spanning-tree algorithm returns the optimal single spanning tree $T_{MWST}$, i.e.:
$C(T) \geq C(T_{MWST})$ for T∈τ.

As proof, let e be the edge with maximal $c_e$ in $T_{MWST}$ found by Boruvka's algorithm. Consider the two disconnected components created by removing e from $T_{MWST}$. Assume by contradiction that there exists a spanning T' tree whose maximal congestion is lower than $c_e$. It must therefore connect the two components with another edge e' whose congestion is lower than $c_e$. Such an edge e' cannot exist due to Boruvka's algorithm trying to add lighter edges before heavier ones.

Figure 4:
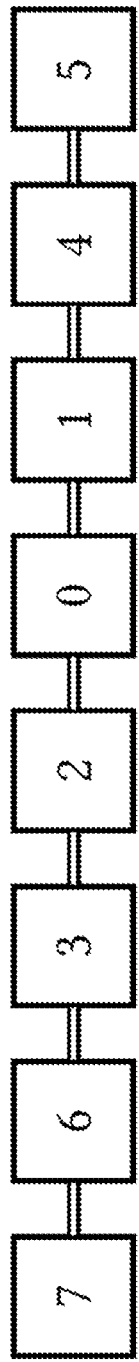
FIG. 4 is a diagram illustrating a non-optimal communication schedule derived from the exemplary topology of FIG. 3 according to some embodiments.

In the case of the architecture illustrated in FIG. 3, an optimal single tree 400 is given by the chain connecting all nodes with dual NVLink edges with the exception of the edge (5, 7), as reflected in FIG. 4. While this strategy offers 600 Gbps bandwidth it stands to reason that this is not optimal, because all the single NVLink connections, e.g., between (0, 3) or the dual connection (5, 7), are not used.

Extending even further, embodiments benefit from the idea that multiple spanning trees could be used independently and concurrently. In the above case, all chains of 8 GPUs that can be formed could be used to balance the network traffic equally over all 8 such chains. In such a case, embodiments could reduce the communication time to ⅞ of the previous time, thus matching the bandwidth offered by a ring synchronization approach typically proposed.

The Spanning Tree Polytope

Assume that two spanning trees exist, T and T'. In this case, we could send a fraction A of the data using T and the remainder of the data (1−λ) using T'. Hence, the amount of data flowing along an edge e is given by $\lambda T_e + (1-\lambda)T'_e$ where $T_e = 1$ if e∈T and zero otherwise. This will consequently lead to $c_e \cdot (\lambda T_e + (1-\lambda)T'_e)$ time to complete the data transfer. If the data flow is thus partitioned appropriately, the time for synchronization can thus be reduced. The following holds:

Claim 2. Let $\tau_k = \{T_1, \ldots, T_k\}$ be k edge-disjoint spanning trees of G. Splitting traffic over the trees with weights $\alpha_T \propto C^{-1}(T)$ achieves an improved synchronization time.

$$\left[ \sum_{T \in \tau} C^{-1}(T) \right]^{-1} \leq \frac{1}{k} \cdot \max_{T \in \tau_k} C(T)$$

Thus, since the trees are disjoint, communication using any one of them does not interfere with the others. Since each tree only carries a fraction $\alpha_k$ of the data, it requires $\alpha_k C(T_k)$ time.

For example, if all edges have unit weight $c_e = 1$, then $\alpha_i = 1/k$ and the total time is $1/k$.

Further, embodiments can generalize this to trees that interfere with each other. In this case, the bandwidth between trees has to be shared. Denote by τ the set of all spanning trees of the graph G(V, E). This set may be large, but its size is calculatable. It is the determinant of the Laplacian matrix of G after a row and column are removed. For small graphs such as the ones usually found in hardware on a single machine, enumerating τ is also feasible. Since each T∈τ corresponds to a synchronization strategy a finite convex combination of such trees also corresponds to a valid strategy. Let $\alpha_T$ denote the amount of data synchronized using T. Then, the amount of data required to flow along edge e is given by $\Sigma_{T \in \tau} \alpha_T T_e$. As a reminder, $T_e = 1$ if e∈T and zero otherwise.

Consequently, the total synchronization time is given multiplying the above by $c_e$ for each edge. This yields an optimization problem that can be referred to as a "spanning tree packing problem":

$$C(G) := \min_{\alpha} \max_e c_e \cdot \sum_{T \in \tau} \alpha_T T_e \qquad (2)$$

Thus, for any connected graph the value C(G) of the optimization problem (2) satisfies the following "Lemma (3)":

$$\max_e c_e \geq C(T_{MWST}) \geq C(G) \geq \frac{n-1}{\sum_e c_e^{-1}} \qquad (3)$$

As proof, because the graph is connected, there has to be at least one spanning tree. Moreover, the slowest communication cannot be slower than the slowest link. This proves the first inequality. The second inequality follows from the fact that the minimum weight spanning tree is a vertex in the spanning tree polytope. Setting $\alpha_{T_{MWST}}=1$ and zero otherwise will recover $C(T_{MWST})$. Because $C(G)$ minimizes over all values of $\alpha$ the former is larger than the latter. For the last inequality observe:

$$C(G) = \min_\alpha \max_e c_e \cdot \sum_T \alpha_T T_e \qquad (4)$$

$$= \min_\alpha \sum_T \alpha_T \max_e c_e T_e \geq \min_\alpha \sum_T \frac{\alpha_T(n-1)}{\sum_e c_e^{-1} T_e}$$

$$\geq \min_\alpha \frac{\sum_T \alpha_T(n-1)}{\sum_e c_e^{-1}} = \frac{n-1}{\sum_e c_e^{-1}}$$

The first inequality (4) follows from the fact that any spanning tree T has exactly n−1 edges and that for any set $x_1, \ldots, x_{n-1}$ of n−1 nonnegative numbers, $\max_i x_i \geq (n-1)/(\Sigma_i x_i^{-1})$. The second inequality is due to $T_e \leq 1$ and the fact that the expression is monotonically decreasing with $T_e$. Finally, $\Sigma_T \alpha_T=1$ is used.

The bound above may seem unusual. Rephrased in terms of bandwidth, it becomes more intuitive. As a reminder, $b_e=1/c_e$ is the bandwidth of physical link corresponding to edge e. Let $B(G)=1/C(G)$ denote the overall bandwidth achieved by the synchronization schedule. In other words, using the network it is possible to synchronize the gradients $B(G)$ times per unit of time. Then:

$$B(G) \leq \frac{\sum_e b_e}{n-1}$$

Thus, the highest bandwidth achievable by any graph is bounded from above by the sum of over all edge bandwidths uniformly distributed over a single spanning tree (n−1 edges).

Figure 5:
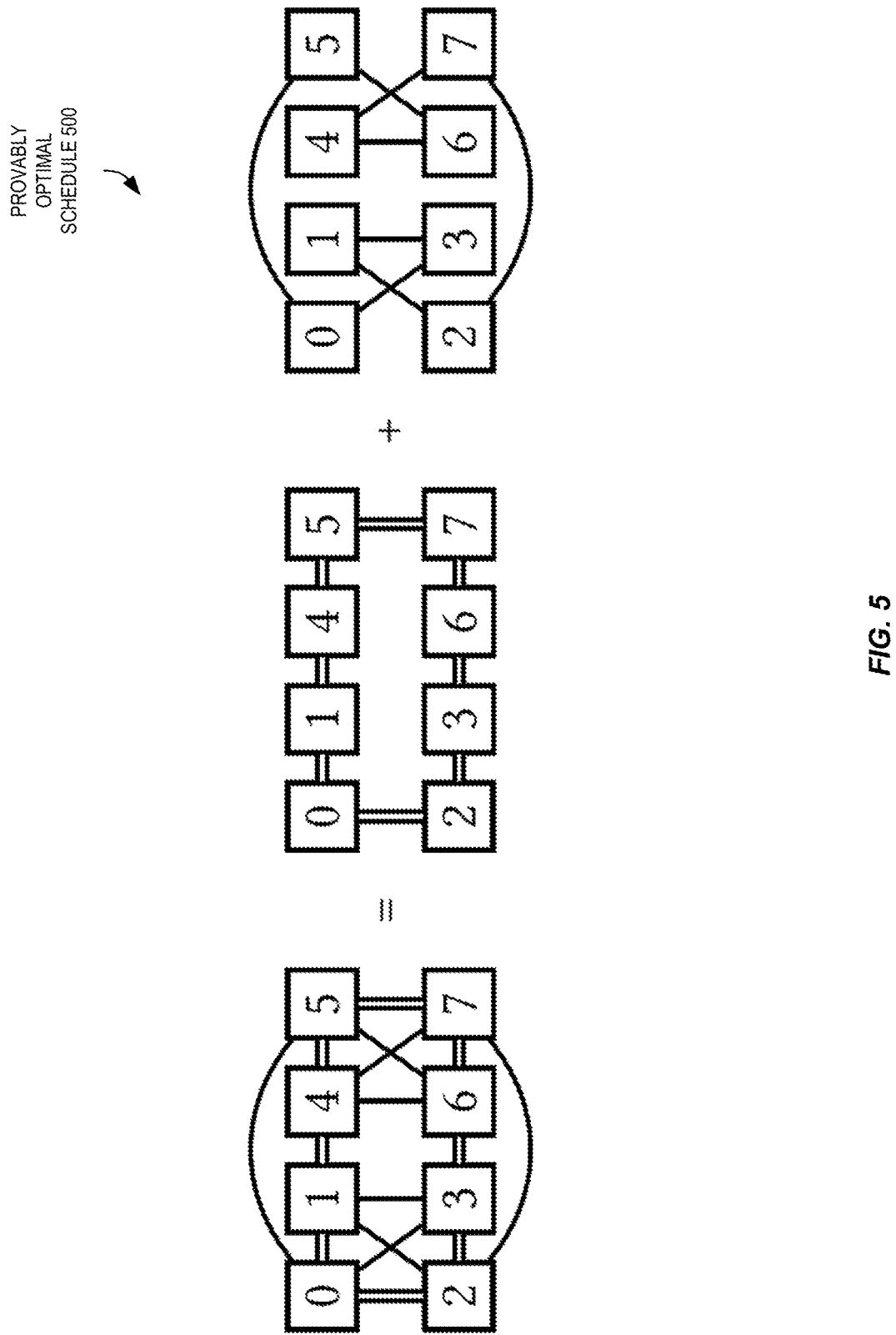
FIG. 5 is a diagram illustrating the determination of an optimal communication schedule derived from the exemplary topology of FIG. 3 according to some embodiments.

Now consider a special case of the above bound: a ring with n vertices. In this case, any chain with n−1 edges is a spanning tree. In particular, 1/n of the data can be sent across n equally weighted chains with n−1 edges. Likewise, if we have a graph that can be decomposed into several rings, the decomposition can be applied to each ring separately. In the case of the component design shown in FIG. 3, we obtain the following strategy reflected in FIG. 5, in which the design is broken into a provably optimal schedule 500.

Thus, synchronization over a ring graph with uniform edge congestions $c_e=1$ using n paths of length n−1 and with weights $\alpha_T=1/n$ is optimal. As proof, this achieves makespan of (n−1)/n which matches the lower bound of the lemma provided above as lemma (3).

Moreover, the decomposition of a component architecture shown of FIG. 3 into two disjoint rings and further decomposition of each ring as explained above is optimal for these networks.

As proof, setting for normalization $c_e=1$ for NVLinks, the above setup achieves a makespan of 7/24 which matches the lower bound of lemma (3). As further validation, all NVLink connections in the graph are used at full bandwidth. Accordingly, the possible bandwidth for a particular schedule of a topology can be determined, and if it is the same as a maximal theoretical bandwidth for the topology (or within some threshold amount) then the schedule can be deemed to be "optimal."

Figure 6:
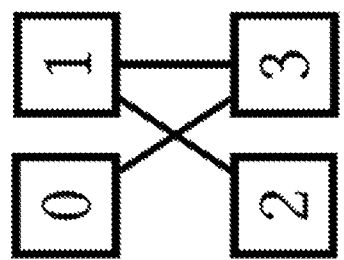
FIG. 6 is a diagram illustrating the determination of another multi-tree optimal communication schedule derived from another exemplary topology according to some embodiments.
Figure 6:
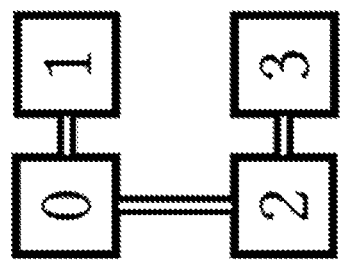
Figure 6:
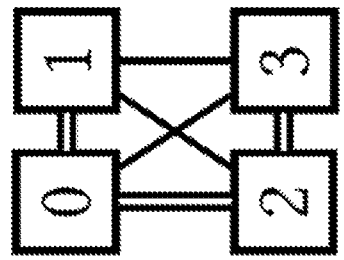

These techniques can flexibly be used with a variety of architectures. For example, in some embodiments a compute instance may be used that is half of the GPU-related architecture of FIG. 3 (e.g., GPUs 0-3 or GPUs 4-7). An optimal schedule 600, as shown in FIG. 6, can be found and can be further to be optimal according to lemma (3).

In general, the design of optimal algorithms may require optimization, e.g., solving the convex optimization problem (2) presented above. However, this has an optimal solution. Moreover, because the number of spanning trees is finite, the spanning tree polytope is finite and any element in the spanning tree polytope can be expressed by a finite convex combination of trees (and thus schedules).

Networks with Switches

When performing synchronization using switches, the problem is more complicated. Thus, not only are spanning trees considered, but also schedules are considered. Although a schedule as used herein can reflect the simple use of spanning trees, in some cases a schedule is a fully-specified communication pattern along the edges of the graph that can achieve the aggregation. Schedules may be more complex than simple trees because data needs to flow through the switches that cannot be aggregated.

An example of such a network design is reflected in the example resource configuration 800 of a type "A" of compute instance in FIG. 8. Any data crossing the central PCI express bridge also needs to flow through other bridges, thus consuming parts of their capacity. Moreover, it is quite likely that some edges will have to participate in the schedule twice or more. For example, consider the star graph with a switch in the center and compute nodes as spokes. Let $S_e$ denote the (integer) number of times node e participates in schedule S.

As a definition, let S denote the set of efficient schedules. An efficient schedule S is a schedule for which there does not exist S' such that $S'_e \leq S_e$ for all edges and $S'_e < S_e$ for at least one edge.

It is clear that one could consider using only efficient schedules since others are obviously wasteful. Equation 2 could therefore be modified in two ways. First, replace the summation over trees with summation over efficient schedules, and second, replacing $T_e$ with $S_e$. Thus, equation (5) results:

$$C(G) := \min_\alpha \max_e c_e \cdot \sum_{S \in \mathcal{S}} \alpha_S S_e \qquad (5)$$

Given the set of schedules S the optimization of Equation 5 (as for Equation 2) is a linear program. It is therefore solvable in polynomial time. Alas, S could be very large which would make this computation very heavy. In the following, some characteristics of S and other properties of the solution space are described that make the computation more manageable.

Figure 7:
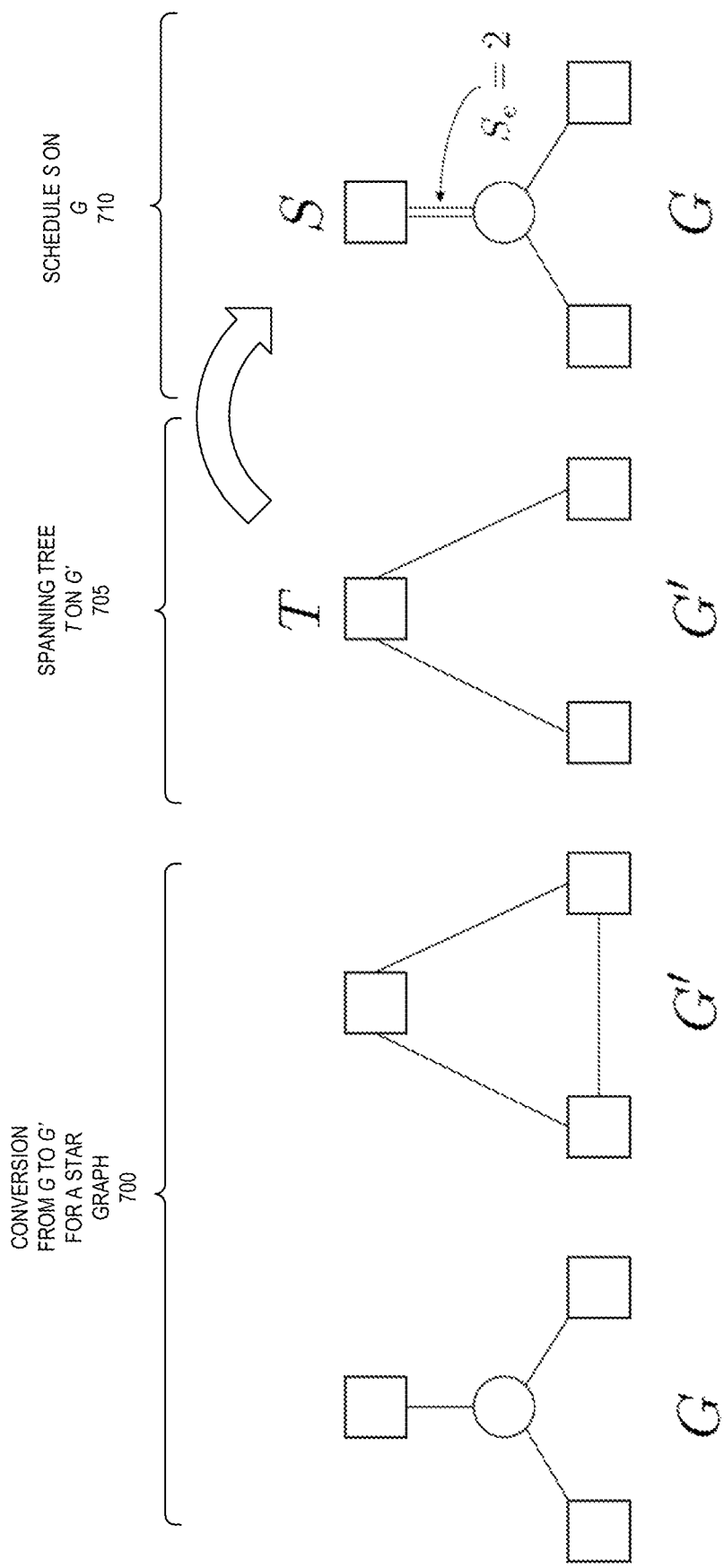
FIG. 7 is a diagram illustrating the contraction of a star graph including a switch into a reduced star graph according to some embodiments.

Let G' be a modified graph in which all switches are contracted. That is, every path between compute nodes which consists of only switches is replaced with direct edges between. Switch nodes are removed and their adjacent edges are removed. For example, as shown in FIG. 7, the star graph with a switch in the center and compute nodes as spokes is transformed (or "converted") as shown at 700. FIG. 7 also shows how a spanning tree T on G' 705 can be translated to a schedule S on G 710.

Accordingly, it can be determined that every schedule S ∈ S on G induces a spanning tree on G'. As proof, it is easy to verify that completing cycles on G' is wasteful. Let e be an edge on a cycle in S' and assume by contradiction that S' E S is efficient. Note that one can always orient the aggregation order such that the total sum of aggregates is available on one of the nodes e connects to. Therefore, removing the communication along e is harmless, hereby proving that S'∉S.

Note also that if G' is simple there is a one-to-one mapping between spanning trees on G' and schedules S∈S on G. Moreover, G' is simple when there is only one option to route messages between compute nodes via switches.

Embodiments can use this fact to solve the synchronization problem for any network of computing elements. In the specific case of servers using the architecture shown in FIG. 8, embodiments can obtain a schedule as indicated in FIGS. 9-12, which shows a set of stages for one spanning tree— embodiments can use one such spanning tree, or multiple different spanning trees in this multi-stage interleaved manner.

Figure 9:
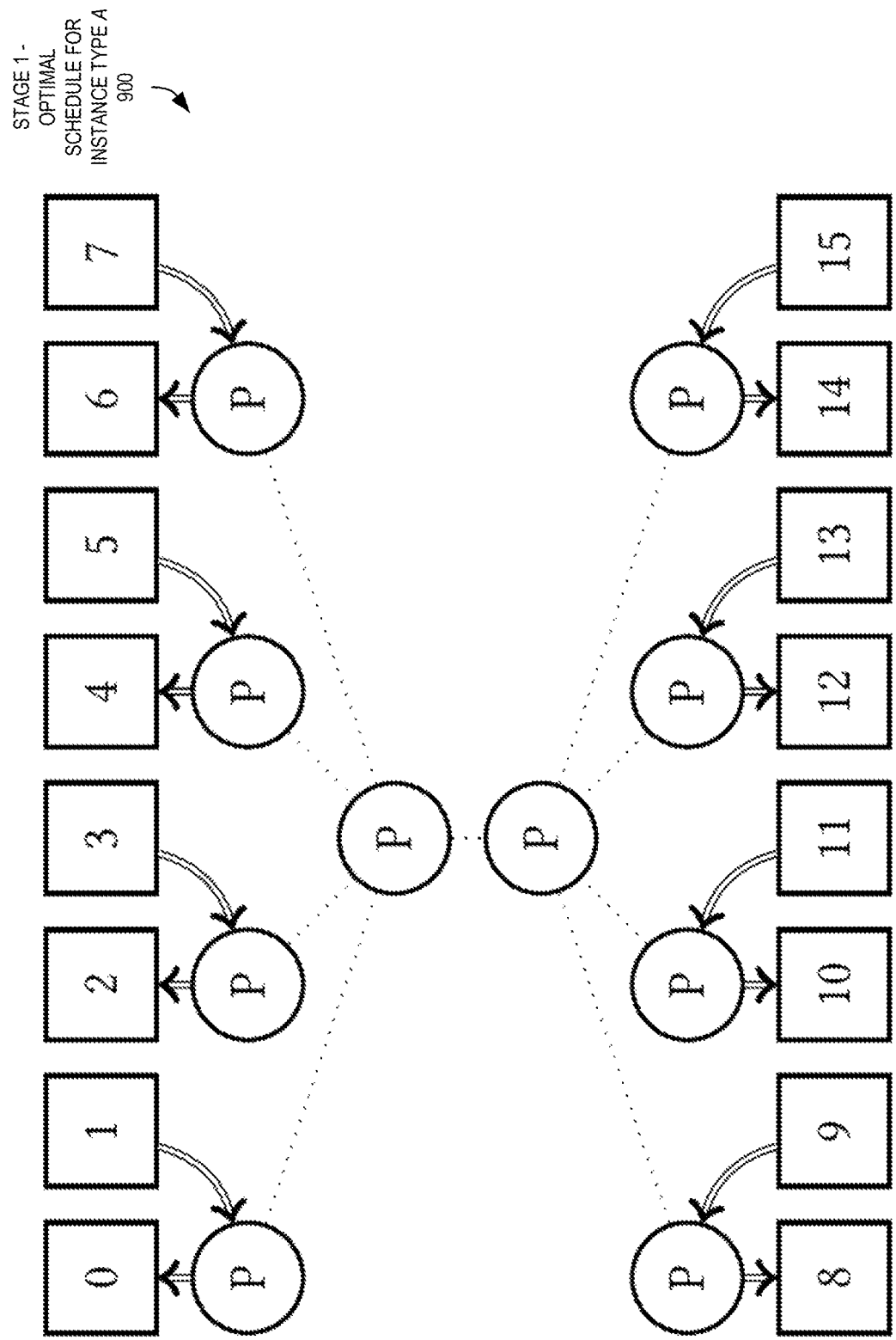
FIG. 9 is a diagram illustrating an exemplary first stage of an optimal schedule derived for the resource configuration of the first exemplary instance type of FIG. 8 according to some embodiments.
Figure 10:
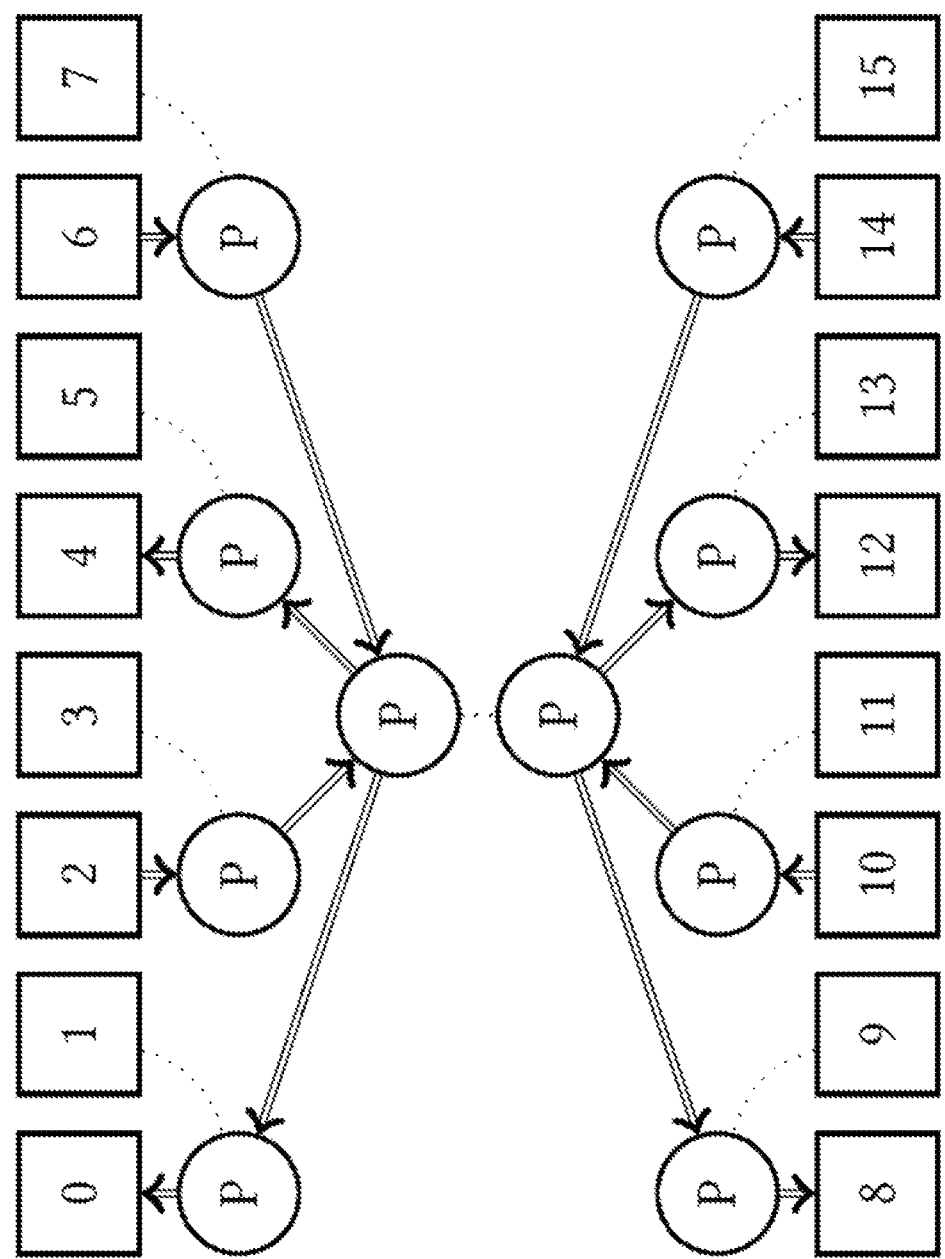
FIG. 10 is a diagram illustrating an exemplary first second of an optimal schedule derived for the resource configuration of the first exemplary instance type of FIG. 8 according to some embodiments.
Figure 11:
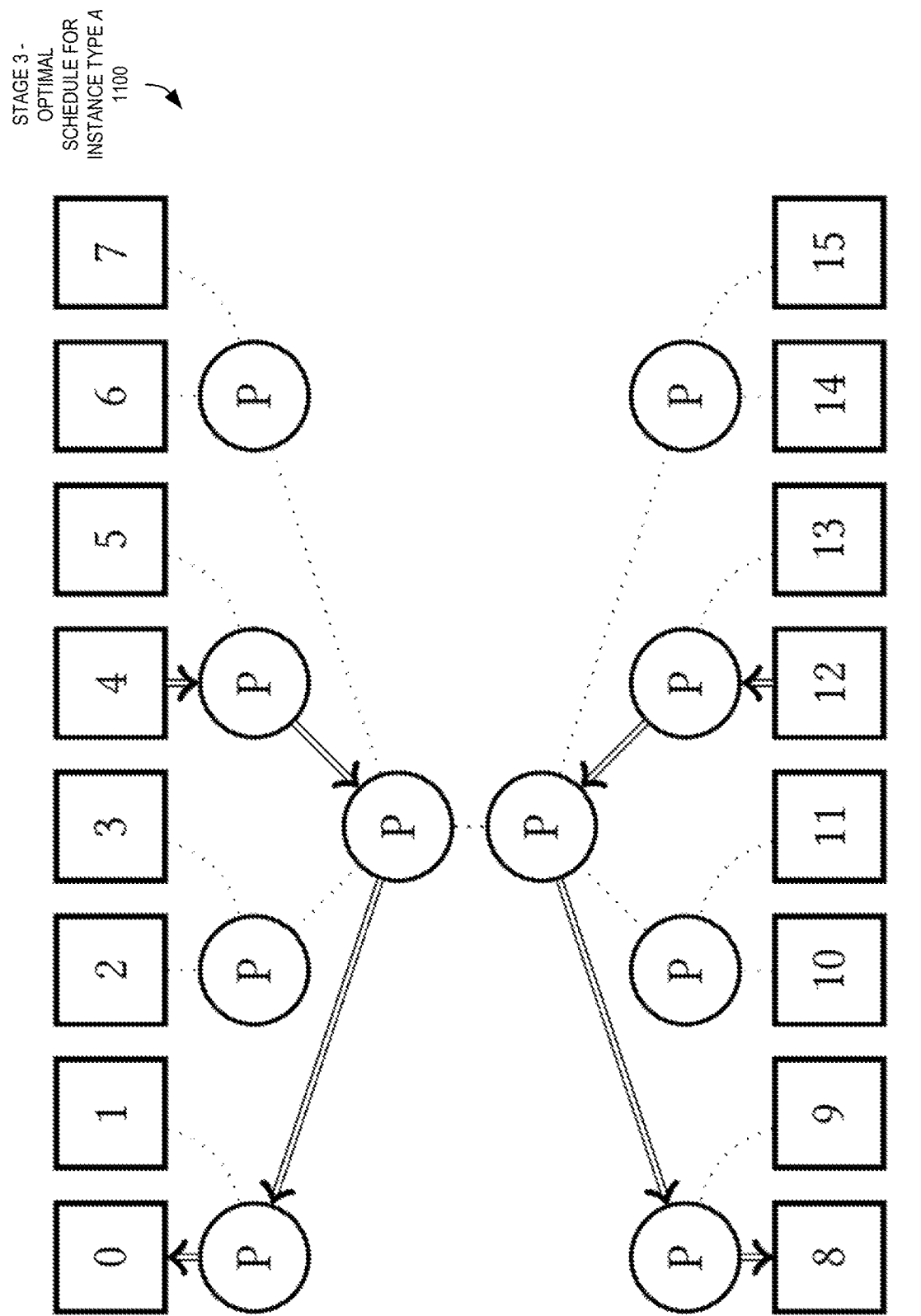
FIG. 11 is a diagram illustrating an exemplary third stage of an optimal schedule derived for the resource configuration of the first exemplary instance type of FIG. 8 according to some embodiments.
Figure 12:
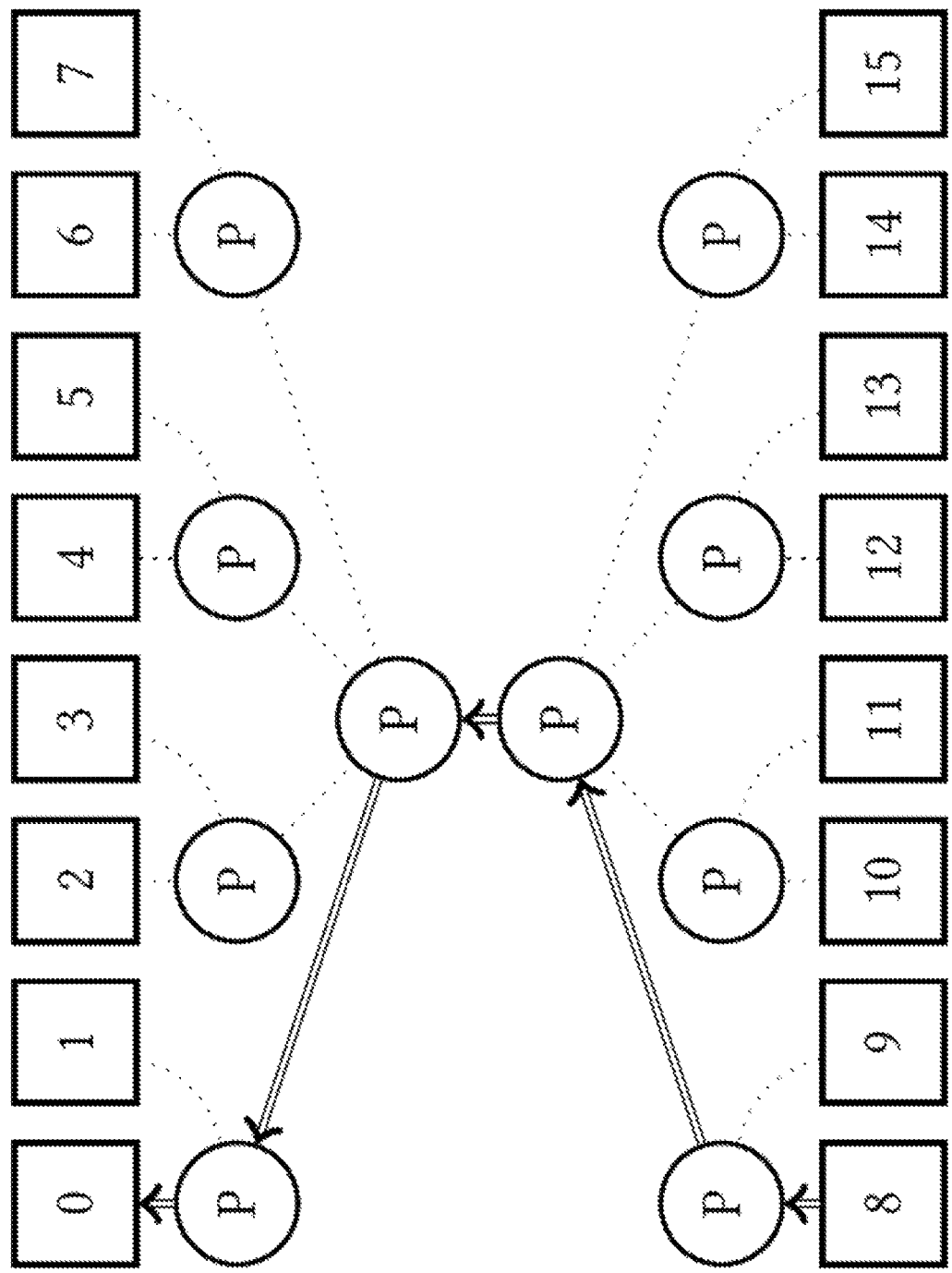
FIG. 12 is a diagram illustrating an exemplary fourth stage of an optimal schedule derived for the resource configuration of the first exemplary instance type of FIG. 8 according to some embodiments.

In FIG. 9 at a first stage 900, the odd-numbered GPUs send data to the a next-lower even-numbered GPU. In FIG. 10 at a second stage 1000, this data is aggregated by some of the even-numbered GPUs (2, 6, 10, 14) and sent to other remaining even-numbered GPUs (0, 4, 8, 12). In FIG. 11 at a third stage 1100, this data is aggregated by some of these remaining even-numbered GPUs (4, 12) and sent to the others of the remaining even-numbered GPUs (0, 8). In FIG. 12 at a fourth stage 1200, the data is aggregated and sent by GPU (8) to GPU (0), where thereafter can perform the final computation and broadcast the update out to the other GPUs.

Surprisingly, the single 16-lane PLX between both halves (as shown in FIG. 8) is not the bottleneck when scheduling efficiently. It is observed that the utilization of the PLX within the cards, the PLX interconnecting the cards, and the connection between the two central PLX chips is approximately 15:14:8. This can be seen, e.g., by edge counting over the schedule presented herein in FIGS. 9-12 and by averaging over all schedules and lags. Furthermore, for this architecture, the optimal schedule is given by the first three stages (as there is no need to synchronize the last step). Thus, the utilization is approximately 7:6 between intra-card PLX and inter-card PLX chips respectively. In both cases the bottleneck is the intra-card connectivity, a rather surprising result.

Note that the above construction does not hold when the mapping from spanning trees in G' to schedules in G is not unique. This is the case, for example, for Clos 6 networks. The next observation helps reduce the computation overhead for Clos networks.

Notably, there exists an optimal solution that mirrors all automorphic schedules in the graph. More specifically, let $\pi$ be a permutation on the nodes of G(V, E) such that $(\pi((v_1), \pi(v_2)) \in E$ iff $(v_1, v_2) \in E$. Then, there exists an optimal solution for which $\alpha_{s^2} = \alpha_{s^2}$ where $S^2 = \pi(S^1)$.

As proof, let $f_\alpha = \max_e c_e \cdot \Sigma_{s \in s} \alpha_s s_e$. Note that $f(\alpha^\pi) = f(\alpha)$ where $\alpha_s^\pi = \alpha_{\pi(S)}$. Moreover, f in convex with respect to $\alpha$. Therefore, $f(\alpha') = f((\alpha + \alpha^\pi)/2) \leq f_\alpha$. The fact that $\alpha_s' = \alpha'_{\pi(s)}$ completes the proof.

As is known, Clos networks are perfectly symmetrical. That is, they are invariant to all permutation of the middle layer of switches. The above observation makes the optimal solution trivial. That is, if there are m switches in the middle, every communication between two compute nodes can be split into m equally-sized payloads, and m schedules with weight 1/m each can be used.

Figure 13:
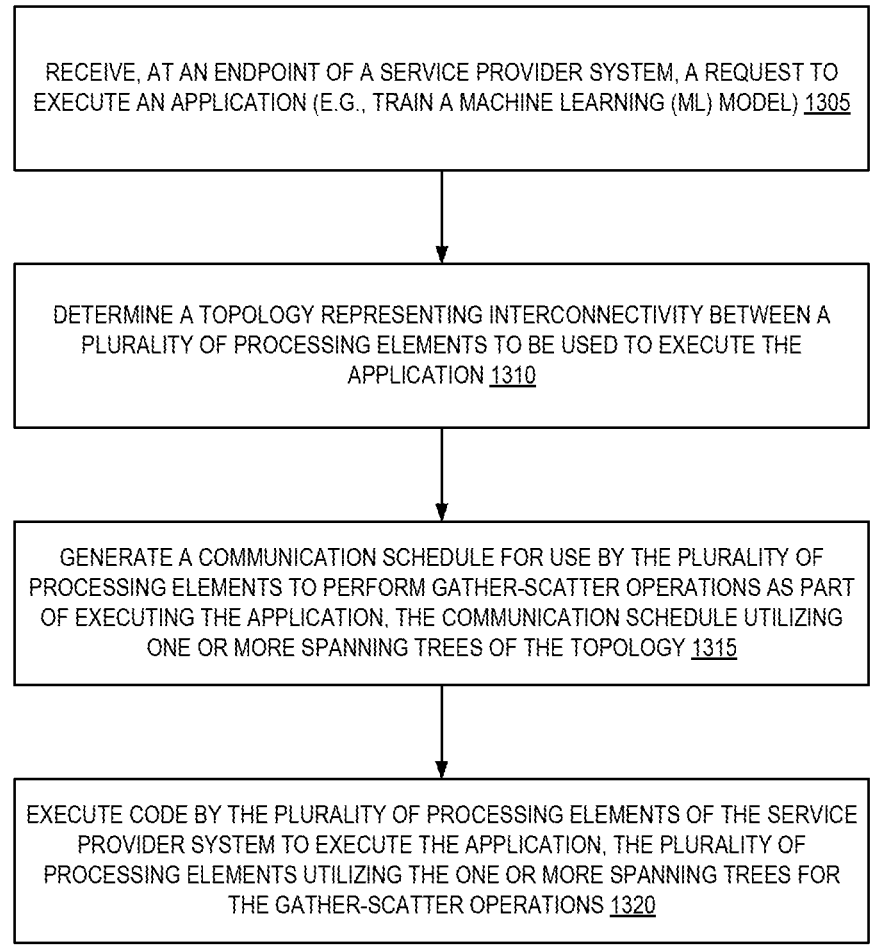
FIG. 13 is a flow diagram illustrating operations of a method for determining and utilizing an optimal aggregation schedule according to some embodiments.

FIG. 13 is a flow diagram illustrating operations of a method for determining and utilizing an optimal aggregation schedule according to some embodiments. Some or all of the operations 1300 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1300 are performed by the aggregation schedule 114 or service 112 of the other figures.

The operations 1300 include, at block 1305, receiving, at an endpoint of a service provider system, a request to execute an application (e.g., train a machine learning (ML) model such as a neural network, execute a high-performance computing task, etc.).

The operations 1300 include, at block 1310, determining a topology representing interconnectivity between a plurality of processing elements to be used to execute the application.

In some embodiments, the plurality of processing elements comprise a plurality of graphical processing units (GPUs) or hardware accelerators (e.g., AI/ML accelerator cards). In some embodiments, the plurality of processing elements are implemented within a single computing device. In some embodiments, the plurality of processing elements are implemented within a plurality of computing devices.

In some embodiments, the plurality of processing elements aggregate data sent using the one or more spanning trees. In some embodiments, the topology further includes one or more switches that do not aggregate data.

The operations 1300 include, at block 1315, generating a communication schedule for use by the plurality of processing elements to perform gather-scatter operations as part of execute the application, the communication schedule utilizing the one or more spanning trees of the topology.

In some embodiments, the communication schedule utilizes at least two spanning trees of the topology, and in some embodiments, the communication schedule utilizes at least three spanning trees of the topology. In some embodiments, the communication schedule is an optimal schedule for the topology, in that a determined bandwidth for the schedule is equal to a determined maximum bandwidth for the topology, or is of a highest bandwidth of all possible communications schedules.

In some embodiments, generating the communication schedule comprises generating only one communication schedule using a greedy algorithm. In some embodiments, generating the communication schedule comprises: generating a first candidate communication schedule; determining that the first candidate communication schedule is not optimal; generating a second candidate communication schedule; and using the second candidate communication schedule as the communication schedule based on determining that the second candidate communication schedule is optimal.

In some embodiments, the communication schedule includes a plurality of stages that are interleaved.

The operations 1300 include, at block 1320, executing code by the plurality of processing elements of the service provider system to execute the application, the plurality of processing elements utilizing the one or more spanning trees for the gather-scatter operations.

In some embodiments, the plurality of processing elements stream data elements using the one or more spanning trees, and at one or more points in time during the execution of the application the processing elements concurrently stream data elements across a plurality of links of the topology.

Figure 14:
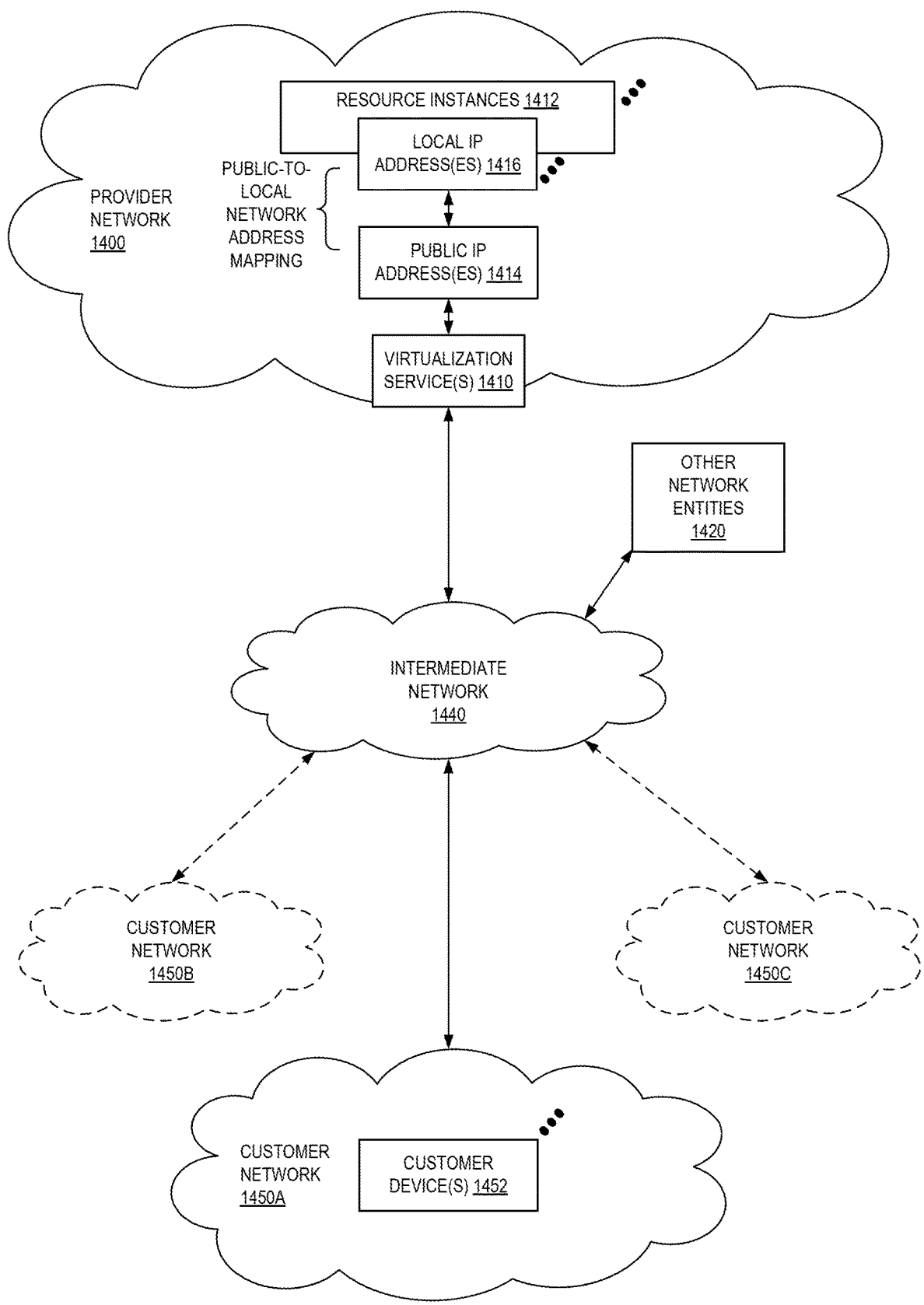
FIG. 14 illustrates an example provider network environment according to some embodiments.

FIG. 14 illustrates an example provider network (or "service provider system") environment according to some embodiments. A provider network 1400 may provide resource virtualization to customers via one or more virtualization services 1410 that allow customers to purchase, rent, or otherwise obtain instances 1412 of virtualized resources, including but not limited to computation and storage resources, implemented on devices within the provider network or networks in one or more data centers. Local Internet Protocol (IP) addresses 1416 may be associated with the resource instances 1412; the local IP addresses are the internal network addresses of the resource instances 1412 on the provider network 1400. In some embodiments, the provider network 1400 may also provide public IP addresses 1414 and/or public IP address ranges (e.g., Internet Protocol version 4 (IPv4) or Internet Protocol version 6 (IPv6) addresses) that customers may obtain from the provider 1400.

Conventionally, the provider network 1400, via the virtualization services 1410, may allow a customer of the service provider (e.g., a customer that operates one or more client networks 1450A-1450C including one or more customer device(s) 1452) to dynamically associate at least some public IP addresses 1414 assigned or allocated to the customer with particular resource instances 1412 assigned to the customer. The provider network 1400 may also allow the customer to remap a public IP address 1414, previously mapped to one virtualized computing resource instance 1412 allocated to the customer, to another virtualized computing resource instance 1412 that is also allocated to the customer. Using the virtualized computing resource instances 1412 and public IP addresses 1414 provided by the service provider, a customer of the service provider such as the operator of customer network(s) 1450A-1450C may, for example, implement customer-specific applications and present the customer's applications on an intermediate network 1440, such as the Internet. Other network entities 1420 on the intermediate network 1440 may then generate traffic to a destination public IP address 1414 published by the customer network(s) 1450A-1450C; the traffic is routed to the service provider data center, and at the data center is routed, via a network substrate, to the local IP address 1416 of the virtualized computing resource instance 1412 currently mapped to the destination public IP address 1414. Similarly, response traffic from the virtualized computing resource instance 1412 may be routed via the network substrate back onto the intermediate network 1440 to the source entity 1420.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1400; a customer may then assign their allocated public IP addresses to particular resource instances allocated to the customer. These public IP addresses may be referred to as customer public IP addresses, or simply customer IP addresses. Instead of being assigned by the provider network 1400 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 15:
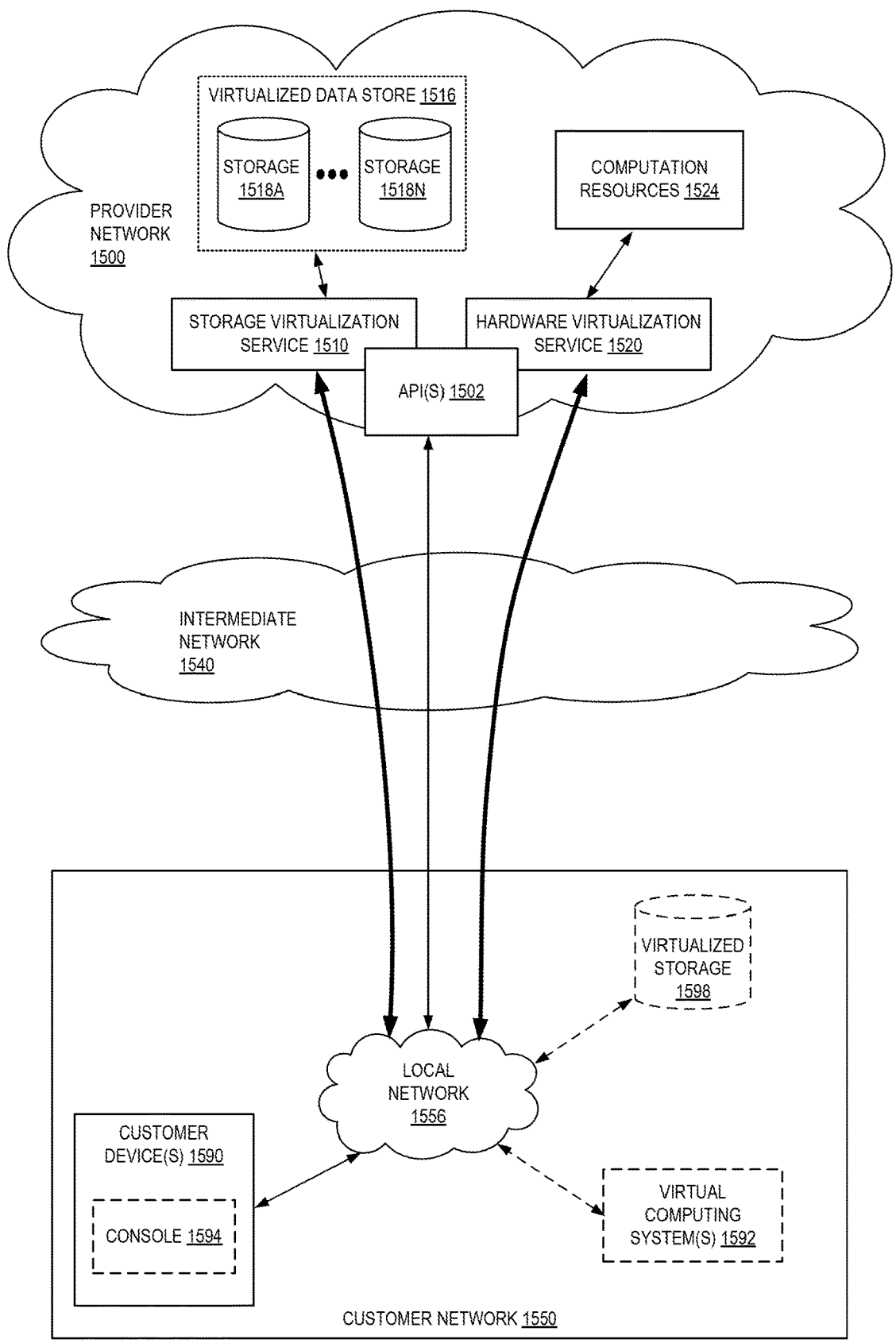
FIG. 15 is a block diagram of an example provider network that provides a storage virtualization service and a hardware virtualization service to customers according to some embodiments.

FIG. 15 is a block diagram of an example provider network that provides a storage virtualization service and a hardware virtualization service to customers, according to some embodiments. Hardware virtualization service 1520 provides multiple computation resources 1524 (e.g., VMs) to customers. The computation resources 1524 may, for example, be rented or leased to customers of the provider network 1500 (e.g., to a customer that implements customer network 1550). Each computation resource 1524 may be provided with one or more local IP addresses. Provider network 1500 may be configured to route packets from the local IP addresses of the computation resources 1524 to public Internet destinations, and from public Internet sources to the local IP addresses of computation resources 1524.

Provider network 1500 may provide a customer network 1550, for example coupled to intermediate network 1540 via local network 1556, the ability to implement virtual computing systems 1592 via hardware virtualization service 1520 coupled to intermediate network 1540 and to provider network 1500. In some embodiments, hardware virtualization service 1520 may provide one or more APIs 1502, for example a web services interface, via which a customer network 1550 may access functionality provided by the hardware virtualization service 1520, for example via a console 1594 (e.g., a web-based application, standalone application, mobile application, etc.). In some embodiments, at the provider network 1500, each virtual computing system 1592 at customer network 1550 may correspond to a computation resource 1524 that is leased, rented, or otherwise provided to customer network 1550.

From an instance of a virtual computing system 1592 and/or another customer device 1590 (e.g., via console 1594), the customer may access the functionality of storage virtualization service 1510, for example via one or more APIs 1502, to access data from and store data to storage resources 1518A-1518N of a virtual data store 1516 provided by the provider network 1500. In some embodiments, a virtualized data store gateway (not shown) may be provided at the customer network 1550 that may locally cache at least some data, for example frequently accessed or critical data, and that may communicate with virtualized data store service 1510 via one or more communications channels to upload new or modified data from a local cache so that the primary store of data (virtualized data store 1516) is maintained. In some embodiments, a user, via a virtual computing system 1592 and/or on another customer device 1590, may mount and access virtual data store 1516 volumes, which appear to the user as local virtualized storage 1598.

While not shown in FIG. 15, the virtualization service(s) may also be accessed from resource instances within the provider network 1500 via API(s) 1502. For example, a customer, appliance service provider, or other entity may access a virtualization service from within a respective virtual network on the provider network 1500 via an API 1502 to request allocation of one or more resource instances within the virtual network or within another virtual network.

Illustrative System

Figure 16:
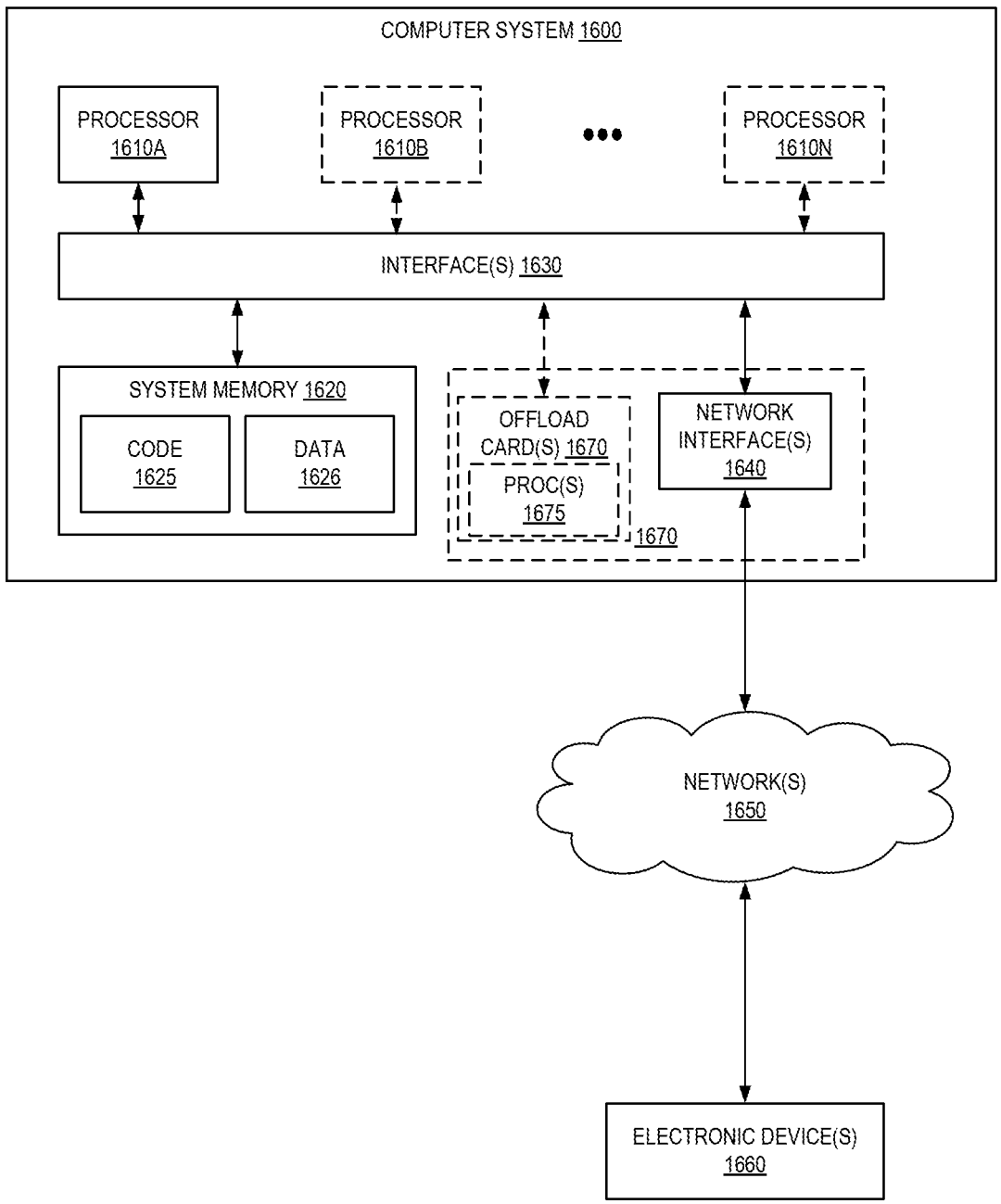
FIG. 16 is a block diagram illustrating an example computer system that may be used in some embodiments.

In some embodiments, a system that implements a portion or all of the techniques for determining and utilizing optimal aggregation schedules as described herein may include a general-purpose computer system that includes or is configured to access one or more computer-accessible media, such as computer system 1600 illustrated in FIG. 16. In the illustrated embodiment, computer system 1600 includes one or more processors 1610 coupled to a system memory 1620 via an input/output (I/O) interface 1630. Computer system 1600 further includes a network interface 1640 coupled to I/O interface 1630. While FIG. 16 shows computer system 1600 as a single computing device, in various embodiments a computer system 1600 may include one computing device or any number of computing devices configured to work together as a single computer system 1600.

In various embodiments, computer system 1600 may be a uniprocessor system including one processor 1610, or a multiprocessor system including several processors 1610 (e.g., two, four, eight, or another suitable number). Processors 1610 may be any suitable processors capable of executing instructions. For example, in various embodiments, processors 1610 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1610 may commonly, but not necessarily, implement the same ISA.

System memory 1620 may store instructions and data accessible by processor(s) 1610. In various embodiments, system memory 1620 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 1620 as code 1625 and data 1626.

In one embodiment, I/O interface 1630 may be configured to coordinate I/O traffic between processor 1610, system memory 1620, and any peripheral devices in the device, including network interface 1640 or other peripheral interfaces. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computer system 1600 and other devices 1660 attached to a network or networks 1650, such as other computer systems or devices as illustrated in FIG. 1, for example. In various embodiments, network interface 1640 may support communication via any suitable wired or wireless general data networks, such as types of Ethernet network, for example. Additionally, network interface 1640 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1600 includes one or more offload cards 1670 (including one or more processors 1675, and possibly including the one or more network interfaces 1640) that are connected using an I/O interface 1630 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1600 may act as a host electronic device (e.g., operating as part of a hardware virtualization service) that hosts compute instances, and the one or more offload cards 1670 execute a virtualization manager that can manage compute instances that execute on the host electronic device. As an example, in some embodiments the offload card(s) 1670 can perform compute instance management operations such as pausing and/or un-pausing compute instances, launching and/or terminating compute instances, performing memory transfer/copying operations, etc. These management operations may, in some embodiments, be performed by the offload card(s) 1670 in coordination with a hypervisor (e.g., upon a request from a hypervisor) that is executed by the other processors 1610A-1610N of the computer system 1600. However, in some embodiments the virtualization manager implemented by the offload card(s) 1670 can accommodate requests from other entities (e.g., from compute instances themselves), and may not coordinate with (or service) any separate hypervisor.

In some embodiments, system memory 1620 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1600 via I/O interface 1630. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1600 as system memory 1620 or another type of memory. Further, a computer-accessible medium may include transmission media or signals such as electrical, electromagnetic, or digital signals, conveyed via a communication medium such as a network and/or a wireless link, such as may be implemented via network interface 1640.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 116A-116N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving, at an application programming interface (API) endpoint of a service provider system, a HyperText Transfer Protocol (HTTP) message indicating a request to train a machine learning (ML) model using a plurality of processing elements, wherein the ML model is a neural network;
    determining a topology representing interconnectivity between the plurality of processing elements to be used to train the ML model;
    generating a communication schedule for use by the plurality of processing elements to perform gather-scatter operations as part of training the ML model, the communication schedule utilizing at least two different spanning trees of the topology; and
    executing model training code by the plurality of processing elements of the service provider system to train the ML model, wherein the plurality of processing elements utilize the at least two different spanning trees for the gather-scatter operations, aggregate data sent using the at least two different spanning trees, and stream data elements using the at least two different spanning trees.

2. The computer-implemented method of claim 1, wherein the plurality of processing elements comprises one or more graphical processing units (GPUs) or accelerators.

3. The computer-implemented method of claim 2, wherein:
    the plurality of processing elements are implemented in a plurality of computing devices;
    the topology includes one or more network switches that communicatively couple at least two of the plurality of computing devices; and
    the one or more network switches do not aggregate data sent using the at least two different spanning trees.

4. A computer-implemented method comprising:
    receiving, at an endpoint of a service provider system, a request to execute an application;
    determining a topology representing interconnectivity between a plurality of processing elements to be used to execute the application;
    generating a communication schedule for use by the plurality of processing elements to perform gather-scatter operations as part of execution of the application, the communication schedule utilizing one or more spanning trees of the topology; and
    executing code by the plurality of processing elements of the service provider system to execute the application, the plurality of processing elements utilizing the one or more spanning trees for the gather-scatter operations.

5. The computer-implemented method of claim 4, wherein the communication schedule utilizes at least two spanning trees of the topology.

6. The computer-implemented method of claim 4, wherein selecting the communication schedule comprises selecting a schedule that minimizes a difference between a theoretical bandwidth of the topology and a determined bandwidth of the schedule.

7. The computer-implemented method of claim 4, wherein generating the communication schedule comprises generating only one communication schedule using a greedy algorithm.

8. The computer-implemented method of claim 4, wherein generating the communication schedule comprises:
  generating a first candidate communication schedule and a second candidate communication schedule;
  determining a first bandwidth of the first candidate communication schedule and a second bandwidth of the second candidate communication schedule; and
  using the second candidate communication schedule as the communication schedule based on determining that the second bandwidth is equal to a theoretical bandwidth of the topology or closer to the theoretical bandwidth than the first bandwidth is.

9. The computer-implemented method of claim 4, wherein the plurality of processing elements comprises a plurality of graphical processing units (GPUs) or accelerators.

10. The computer-implemented method of claim 4, wherein the plurality of processing elements are implemented within a single computing device.

11. The computer-implemented method of claim 4, wherein the plurality of processing elements are implemented within a plurality of computing devices.

12. The computer-implemented method of claim 4, wherein the plurality of processing elements aggregate data sent using the one or more spanning trees.

13. The computer-implemented method of claim 12, wherein the topology further includes one or more switches that do not aggregate data.

14. The computer-implemented method of claim 4, wherein the plurality of processing elements stream data elements using the one or more spanning trees, and wherein at one or more points in time during the execution of the application multiple ones of the plurality of processing elements concurrently stream data elements across a plurality of links of the topology.

15. The computer-implemented method of claim 4, wherein the application comprises training a machine learning (ML) model.

16. The computer-implemented method of claim 4, wherein the communication schedule includes a plurality of stages that are interleaved.

17. A system comprising:
  a plurality of processing elements implemented by a first one or more computing devices; and
  a scheduler including instructions that upon execution cause the scheduler to:
    determine a topology representing interconnectivity between the plurality of processing elements that are to be used to train a ML model;
    generate a communication schedule for use by the plurality of processing elements to perform gather-scatter operations as part of training the ML model, the communication schedule utilizing one or more spanning trees of the topology; and
    execute model training code by the plurality of processing elements to train the ML model, the plurality of processing elements utilizing the one or more spanning trees for the gather-scatter operations.

18. The system of claim 17, wherein the first one or more computing devices that implement the plurality of processing elements comprise a single computing device.

19. The system of claim 17, wherein the plurality of processing elements includes one or more graphical processing units (GPUs) or accelerators.

20. The system of claim 17, wherein the plurality of processing elements are coupled using a plurality of different types of links, and wherein the communication schedule utilizes a plurality of spanning trees of the topology.

* * * * *